United States Patent
Yin (10) Patent No.: US 9,243,613 B2
(45) Date of Patent: Jan. 26, 2016

(54) OPERATING A WIND TURBINE AND A WIND FARM IN DIFFERENT GRID STRENGTH

(71) Applicant: Bo Yin, Brande (DK)

(72) Inventor: Bo Yin, Brande (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 105 days.

(21) Appl. No.: 13/971,911

(22) Filed: Aug. 21, 2013

(65) Prior Publication Data

US 2014/0159367 A1 Jun. 12, 2014

(30) Foreign Application Priority Data

Sep. 21, 2012 (EP) ..................................... 12185506

(51) Int. Cl.
| | |
|---|---|
| F03D 9/00 | (2006.01) |
| F03D 7/02 | (2006.01) |
| F03D 7/04 | (2006.01) |
| H02J 3/38 | (2006.01) |

(52) U.S. Cl.
CPC .............. *F03D 7/028* (2013.01); *F03D 7/0284* (2013.01); *F03D 7/043* (2013.01); *F03D 7/048* (2013.01); *F05B 2270/337* (2013.01); *H02J 3/386* (2013.01); *Y02E 10/723* (2013.01); *Y02E 10/763* (2013.01)

(58) Field of Classification Search
USPC ............... 290/44, 55; 700/286, 287, 291, 297
See application file for complete search history.

(56) References Cited

U.S. PATENT DOCUMENTS

| | | | |
|---|---|---|---|
| 2003/0151259 A1* | 8/2003 | Feddersen et al. .............. | 290/44 |
| 2010/0264666 A1* | 10/2010 | Bo et al. ........................... | 290/55 |
| 2011/0313590 A1* | 12/2011 | Kake et al. .................... | 700/297 |
| 2014/0300108 A1* | 10/2014 | Sahukari et al. ................ | 290/44 |

FOREIGN PATENT DOCUMENTS

| | | | |
|---|---|---|---|
| WO | WO 2009083448 A2 | | 7/2009 |
| WO | WO 2010069989 A2 | | 6/2010 |
| WO | WO 2011050807 A2 | * | 5/2011 |
| WO | WO 2011050807 A2 | | 5/2011 |
| WO | WO 2012/041527 A1 | * | 4/2012 |
| WO | WO 2013044923 A1 | | 4/2013 |

* cited by examiner

*Primary Examiner* — Julio Gonzalez Ramirez (57) ABSTRACT

A method for controlling a wind turbine is proposed. The wind turbine is in a wind farm and connected to a point of common coupling that is connected to a utility grid. At least one quantity indicative of a short circuit ratio of the utility grid is measured. A control parameter of a control system controlling the wind turbine and the wind farm is adjusted. based on the measured value of the quantity.

15 Claims, 7 Drawing Sheets

OPERATING A WIND TURBINE AND A WIND FARM IN DIFFERENT GRID STRENGTH

CROSS REFERENCE TO RELATED APPLICATIONS

The present application claims priority to European Patent Office application No. 12185506.8 EP filed Sep. 21, 2012, the entire content of which is hereby incorporated herein by reference.

FIELD OF INVENTION

The present invention relates to a method and to an arrangement for controlling a wind turbine comprised in a wind farm, wherein at least one gain of a controller controlling the wind turbine and/or the wind farm is adjusted based on an estimated short circuit ratio of a utility grid to which the wind turbine is connected via a point of common coupling.

BACKGROUND OF INVENTION

Figure 7:
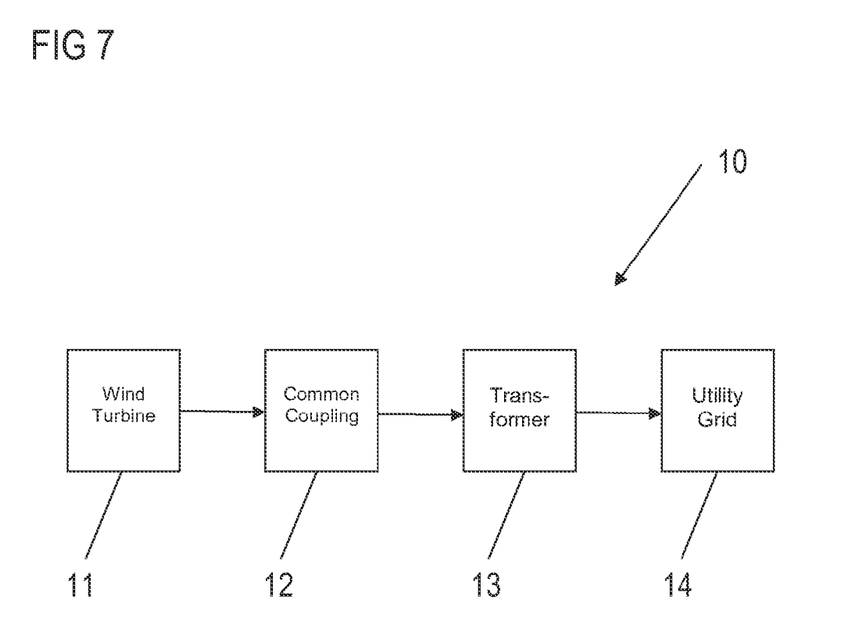
FIG. 7 schematically illustrates a wind farm.

FIG. 7 schematically illustrates a wind farm 10. A wind farm 10 may comprise one or more wind turbines 11 which are connected to a common node which may also be referred to as point of common coupling 12 to which the electric energy is provided and from where the electric energy is transferred to the utility grid 14, in particular via one or more transformers 13. The utility grid 14 may be connected via a high voltage direct current system or via a high voltage alternating current system.

There have been problems observed, when the wind farm is connected to a weak grid, i.e. a utility grid which has a small short circuit ratio or a large reactance. In particular, the weaker the grid is, the less active power may be transferable to the grid. Transferring maximum active power may require having an angle between the current and the voltage of 90°. However, a maximum operating angle is recommended in traditional power system, for example, 30° because above the certain angle the operating point may rapidly approach the critical point with an incremental change in the transmitted power, characterized by a rapid increase in dV/dQ at the receiving end.

It has been observed, that when the power transmitted approaches the angle stability limit, the voltage at a mid-section of the transmission line may be depressed and voltage collapses may be experienced. According to a conventional system, the voltage controller of the wind turbine causes the wind turbine to inject a large amount of reactive power into the grid which may boost the voltage back to a nominal value. However, the kinetic energy stored in the rotor system of the wind turbine then decreases or pumps back to the system and causing again a depressed voltage which further causes wind turbines to be tripped.

Further, it has been observed that a loss of voltage stability occurs when the wind turbine is connected to a weak grid. A low short circuit ratio may be due to a failure in a transmission line connecting the point of common coupling to the utility grid.

SUMMARY OF INVENTION

Thus, there may be a need for a method and an arrangement for controlling a wind turbine and/or a wind farm, wherein voltage stability may be ensured or improved and wherein active power supplied to the utility grid may be increased and wherein the wind turbines may be operated in a safe and stable manner.

This need may be met by the subject matter according to the independent claims. Advantageous embodiments of the present invention are described by the dependent claims.

According to an embodiment of the present invention, it is provided a method of controlling a wind turbine comprised in a wind farm and connected to a point of common coupling connected to a utility grid, the method comprising: measuring at least one quantity indicative of a short circuit ratio (X, SCR, $\Delta V/\Delta Q$, $\Delta V/\Delta I_d$) of the utility grid; adjusting a control parameter of a control system controlling the wind turbine and the wind farm based on the measured value of the quantity, if the short circuit ratio is smaller than a short circuit ratio threshold.

The method may be performed by a park pilot or a park controller which is communicatively coupled to all wind turbines of the wind farm. In particular, the wind farm controller or park pilot may send one or more control signals to the wind turbine which control signals may cause the wind turbine controller to adjust/change their control parameters or their control parameter.

In particular, parameters of a voltage controller and a current controller of each individual wind turbine may be adjusted/changed due to the control signal sent by the park pilot. Further, the park pilot may comprise its own controller which is adapted to derive reference quantities, such as a reference voltage/current/active power/reactive power to be sent to the individual wind turbine controllers. Also a control parameter of the controller of the park pilot may be adjusted during the method, in particular in a coordinated manner with the adjustment of the control parameters of the wind turbine controllers.

Measuring the at least one quantity may comprise measuring voltage and/or current and/or reactive power and/or active power at the point of common coupling, at one or more wind turbine output terminals, or at any other location between the wind turbine output terminal and the utility grid. From the at least one quantity the short-circuit ratio or the reactance or another equivalent physical quantity may be derivable. When the at least one quantity has been measured at a first location apart from the point of common coupling, the short-circuit ratio at the point of common coupling may be estimated based on the measured quantity at the location apart from the point of common coupling.

Adjusting the control parameter of the control system may comprise adjusting a plurality of control parameters or control coefficients of one or more controllers, comprising wind turbine controller and/or park controllers. Further in particular, if the measured short-circuit ratio or the estimated short-circuit ratio is above the short-circuit ratio threshold value, the control parameters or controlled parameter of the control system may be substantially kept constant for increasing short-circuit ratio. Thereby, the method may be simplified.

By adjusting the control parameter of the control system, if the short-circuit ratio is smaller than a short-circuit ratio threshold value, the voltage stability of the utility grid may be improved, active power supplied to the utility grid may be increased or improved and a safe and stable operation of the wind farm may be achieved.

According to an embodiment of the present invention the wind turbine is operated with active power and/or reactive power capability reserve by giving reactive current/reactive power higher priority than active current and/or active power.

According to an embodiment of the present invention, the adjusting the control parameter of the control system (in particular forming cascaded control loops, the outer loop being much slower than the inner loop) comprises adjusting at least one first gain of a first controller controlling the wind turbine (forming inner control loop), and, in particular simultaneously, adjusting at least one second gain of a second controller (forming outer control loop) controlling the entire wind farm.

The first controller may also be referred to as a wind turbine controller controlling voltage output and current output, active power output and/or reactive power output of the wind turbine. In particular, each wind turbine of the wind farm may comprise such a wind turbine controller. In particular, the first controller may harbor a PI-controller being parameterized by a plurality of coefficients, for current controlling and voltage controlling.

The second controller may be harbored within or associated to the wind farm controller or park pilot. In particular, a cascaded control system may thereby be established, wherein the park pilot voltage controller may be an outer loop, the wind turbine voltage controller (the first controller) may be a middle loop and a wind turbine current controller may be the inner loop. Thus in this situation, the first controller may comprise a voltage controller portion and a current controller portion. In particular, the voltage controller of the park pilot (the second controller) may be much slower (in particular between 2 and 10 times slower) than the voltage controller of the wind turbine. Further, the voltage controller and the wind turbine may be much slower than the current controller in the wind turbine.

In particular, the adjusting the control parameter of the control system may comprise coordinating adjustments of gain factors in the different controllers, i.e. the first controller and the second controller, and in particular also the particular sub-control sections. Thereby, the method may be improved, in particular regarding enhancement of active power output and stabilizing the voltage.

According to an embodiment of the present invention, the first controller comprises a first voltage control portion parameterized with a first voltage controlling proportional coefficient and a first current control portion parameterized with a first current controlling proportional coefficient, wherein adjusting the control parameter of the control system comprises increasing the first current controlling proportional coefficient with decreasing short circuit ratio and decreasing the first voltage controlling proportional coefficient with decreasing short circuit ratio, the adjusting the control parameter being performed in particular such that the first current control portion is faster than the first voltage control portion.

The voltage control portion may be provided to control a voltage output of the wind turbine and the current control portion may be adapted or provided to control a current output of the wind turbine. Both, the voltage control portion and the current control portion may be adapted as a respective PI-controller having corresponding coefficients for parameterization.

The increasing the first current controlling proportional coefficient may be approximately linear with the decreasing of the short-circuit ratio. Also, the decreasing the first voltage controlling proportional coefficient may be at least substantially linear with the decreasing the short-circuit ratio. Thereby, the method may be simplified. Further, the increasing the first current controlling proportional coefficient and/or the decreasing the first voltage controlling proportional coefficient may be coded using a look-up table or for example a mathematical function or the like or by implementing/storing a graph.

Thus in particular, the first current controlling proportional coefficient may be changed in an opposite manner to the change of the first voltage controlling proportional coefficient, in particular such that the first current control portion is much faster than the first voltage control portion. Thereby, voltage stability may be improved and active power output may be increased.

According to an embodiment of the present invention, the second controller comprises a second voltage control portion parameterized with a second voltage controlling proportional coefficient, wherein the adjusting the control parameter of the control system comprises decreasing the second voltage controlling proportional coefficient with decreasing short circuit ratio.

The decreasing the second voltage controlling proportional coefficient may be substantially linear to the decreasing the short-circuit ratio. Thereby, the method may be simplified. Alternatively or additionally, the decreasing the second voltage controlling proportional coefficient may be defined using a look-up table, a graph or a mathematical function.

In particular, the changing the first current controlling proportional coefficient, the first voltage controlling proportional coefficient and/or the second voltage controlling proportional coefficient may be based on a simulation of the electrical system when the short-circuit ratio is modeled to be changed.

According to an embodiment of the present invention, the adjusting the control parameter only if the short circuit ratio is smaller than a short circuit ratio threshold, and the method in particular comprises substantially keeping the first current controlling proportional coefficient, the first voltage controlling proportional coefficient, and the second voltage controlling proportional coefficient constant for a short circuit ratio above the short circuit ratio threshold.

In particular, the inventor observed, that for relatively high short-circuit ratio it is sufficient to keep the gains, i.e. the coefficients, of the respective controllers constant, while stability of the voltage is ensured and active power output is ensured and active power output is improved. Thereby, the method may be simplified.

However, below the short-circuit ratio threshold, voltage stability may not be ensured without adjusting the gain or the control parameter of the control system, as proposed by embodiments of the present invention.

According to an embodiment of the present invention, the short circuit ratio threshold, as obtained for the point of common coupling, is between 2 and 6, in particular between 3 and 5, more in particular between 2.5 and 3.5.

In particular, adjusting the control parameter of the control system may only be performed when the short-circuit ratio is below the short-circuit ratio threshold, thereby simplifying the method.

When the short-circuit ratio is obtained at a location apart or remote from the point of common coupling, the short-circuit ratio at the point of common coupling may be derivable therefore by mathematical operations or mathematical/physical modeling of a transmission line between the two points or of the entire wind farm connected to the utility grid.

According to an embodiment of the present invention, active current output and/or active power output by the wind turbine is limited by a maximum active current and/or maximum active power which is a difference between a first term and a second term which is inversely proportional to the short circuit ratio.

The first term may be related to a square root of a square of an overall maximum current from which a square of a reference reactive current is subtracted. By limiting the active current output in this manner, a capacity reserve (safety margin) may be maintained, in order to ensure a stable operation, especially during transients and under (voltage) disturbance. In particular, the active power output is thereby reduced below its nominal value, in favor of a stable operation of the wind turbine.

According to an embodiment of the present invention, the method further comprises monitoring an amplitude of a electrical quantity, such as, RMS value of turbine terminal voltage, or error signal of turbine voltage controller, and etc., and curtailing active power output by the wind turbine, in particular in a stepwise manner, further in particular by up to e.g. 20% of a nominal active power output, if an oscillation of the monitored amplitude is detected, wherein the measuring the at least one quantity and the adjusting the control parameter is in particular performed after curtailing the active power output.

Normally, the electrical quantity is an alternating voltage having a particular frequency, such as 50 Hz or 60 Hz, but which has constant RMS value and which is maintained by the operation of the wind turbines. However, under a disturbance of the grid the amplitude of the electrical quantity at the turbine terminal (or at any location apart from the point of common coupling) may change, in particular may oscillate, such as with a frequency above 4 Hz e.g. or above 4 Hz. Thereby, the operation may not be ensured in a stable and safe manner.

In order to reduce the oscillation of the monitored amplitude of the electrical quantity, the active power output by the wind turbine is decreased or curtailed which may effectively result in a decrease of the oscillation of the amplitude of the electrical quantity. Further, detection of the oscillation of the amplitude may indicate that the grid adopted or acquired a short-circuit ratio which is pretty low. Thus, performing the estimation of the short-circuit ratio may be indicated, when an oscillation of the amplitude of the voltage has been detected. Further on, by adjusting the control parameter of the control system, the voltage may be driven back having constant amplitude and the desired frequency.

According to an embodiment of the present invention, the measuring, in particular performed at the point of common coupling, comprises adding a voltage perturbation to the voltage reference which will dispatch to all the wind turbines, measuring a voltage and a reactive power before and after the voltage perturbation for obtaining a voltage deviation and a reactive power deviation at the point of common coupling, respectively.

The voltage perturbation may be caused by any change of voltage, for example, in particular also at a location remote from the point of common coupling. The voltage and the reactive power may be measured before, during and after the voltage perturbation. The measuring may be performed by acquiring a number of samples of measured voltages and measured reactive power and/or currents. Causing the voltage perturbation may be achieved by sending voltage reference values to at least one wind turbine which deviate from previous voltage reference values. Thereby, the wind turbine or the wind turbines may be caused to output a voltage deviating from a nominal voltage, for example. In particular, the perturbation may be purposely injected with a specific amplitude and duration. E.g. the perturbation may be added to a voltage reference of the wind turbines and may be supplied to all the wind turbines in scope (or the wind farm). By changing voltage references of wind turbines due to the perturbation, the reactive power generated at the PCC and voltage at PCC may change.

Thereby, the method may be simplified and may be essentially performed using the park pilot or park controller.

In particular, performing the method may not require any additional components beside the existing park pilot and the existing wind turbine controllers.

According to an embodiment of the present invention, the method further comprises forming a ratio of the voltage deviation and the reactive power deviation. This ratio may already be indicative of the short-circuit ratio. However, any other quantity which is proportional to this ratio may e.g. be used as a quantity which is indicative of the short-circuit ratio.

According to an embodiment of the present invention, the causing the voltage perturbation comprises increasing or decreasing a voltage reference supplied to at least one the wind turbine of the wind farm.

The voltage reference may be determined or set by the park pilot or park controller and may be supplied via one or more control lines or in a wireless manner to respective wind turbine controllers which then control an operation of a converter, in particular a AC-DC-AC converter which is connected between a generator of the wind turbine and a output terminal of the wind turbine. The wind turbine controller may thereby control the converter by supplying pulse width modulation signals which control conductance states of one or more controllable switches, such as IGBTs, within the converter. Thereby, the at least one wind turbine may be caused to output a voltage which is changed relative to a previous voltage, thereby causing a voltage perturbation.

According to an embodiment of the present invention, voltage control and/or active power control of the wind turbines of the wind farm are disabled during the measuring, in order to achieve a constant active power production.

In particular, during normal operation each wind turbine controller may adopt a voltage control and/or active power control in order to deliver a desired voltage and a desired active power to the point of common coupling. However, during performing the measurement of the quantity indicative of the short-circuit ratio these control procedures or control mechanisms are disabled, in order to allow an accurate measurement. Further, thereby it may be enabled to achieve a voltage deviation which is required for the measuring of the quantity indicative of the short-circuit ratio.

According to an embodiment of the present invention, the measuring is performed cyclically after every time interval, wherein the time interval is between 1 hour and 24 hours, in particular 12 hours, and/or when oscillation of an amplitude of a electrical quantity (e.g. voltage or RMS of voltage, output of control signals) is detected and/or after initialization of a park pilot controlling the wind farm.

Thereby, it may be ensured to monitor a change of the short-circuit ratio of the grid in a regular manner, thereby enabling to (quickly) react in an appropriate manner by the aforementioned gain adjustments.

Thereby, a stable operation of the wind farm when connected to a utility grid having a changing short-circuit ratio, may be ensured.

It should be understood that features which have been individually or in any combination disclosed, described, explained in the context of a method of controlling a wind turbine may also be applied to an arrangement for controlling a wind turbine according to an embodiment of the present invention and vice versa.

According to an embodiment of the present invention, it is provided an arrangement for controlling a wind turbine comprised in a wind farm and connected to a point of common coupling connected to a utility grid, the arrangement comprising a measurement section adapted to measure at least one quantity indicative of a short circuit ratio of the utility grid, a adjustment section adapted to adjust a control parameter of a control system controlling the wind turbine and the wind farm based on the measured value of the quantity, if the short circuit ratio is smaller than a short circuit ratio threshold.

The arrangement may in particular be housed or comprised in a wind farm controller or wind farm pilot or park pilot. Thereby, the measurement section may be a unit or component apart from the park pilot. The adjustment section may in particular comprise computer code having access to an electronic storage area, in which calibration data, such as look-up tables or mathematical formulas or graphs are stored which may dictate the manner, in which the particular gain coefficients are to be changed depending on the estimated short-circuit ratio.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION OF INVENTION

Figure 1:
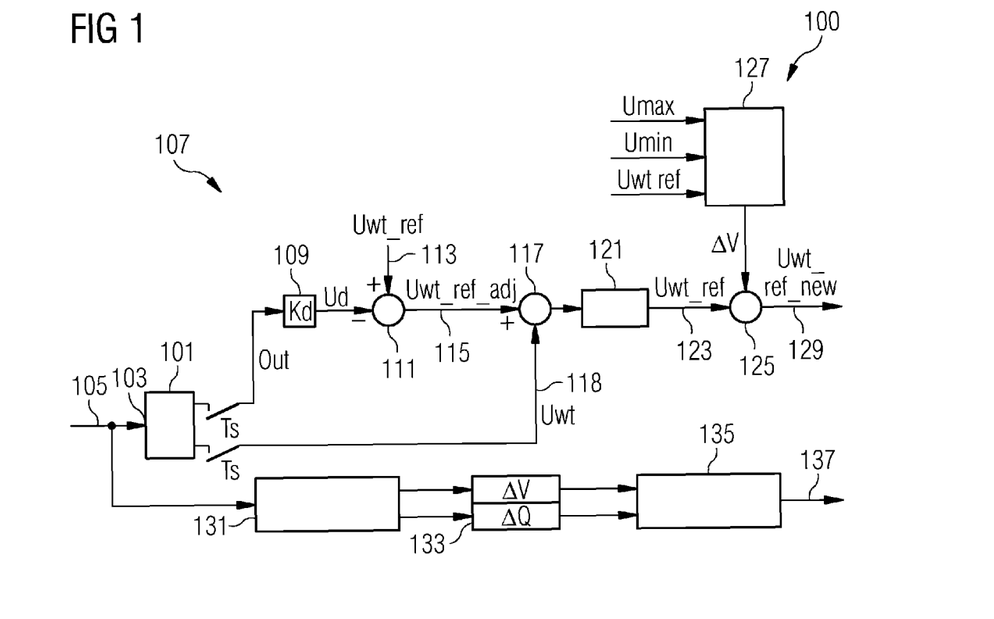
FIG. 1 schematically illustrates a measuring controlling and grid estimation section of an arrangement for controlling a wind turbine according to an embodiment of the present invention.

FIG. 1 schematically illustrates a measurement controlling and grid estimation section 100 according to an embodiment of the present invention which is comprised in or forms an arrangement for controlling a wind turbine according to an embodiment of the present invention.

The section 100 comprises a measurement equipment 101 which receives at an input terminal 103 voltage and current inputs 105 acquired from a not illustrated point of common coupling. The measurement equipment 101 performs averaging and low pass filtering. In particular, the section 100 may be comprised in a park pilot controller. The section 100 illustrated in FIG. 1 only illustrates the voltage controller. However, the same grid estimation scheme may be applied to a reactive power control and power factor controller as well.

A control section 107 comprises a Droop controller 109 which receives a signal Qwf from the measurement equipment 101 and outputs a quantity Ud which is provided to an adding element 111 to which also a reference quantity Uwf_ref 113 is supplied. The adding element 111 outputs the quantity Uwf_ref_adj 115 which is provided to a further adding element 117 to which also the quantity Uwf 119 is supplied which is also output by the measuring equipment 101. The result of the adding element 117 is supplied to the PI-controller 121 which outputs a quantity Uwt_ref 123 which is provided and supplied to a further adding element 125. To this adding element 125 also a quantity $\Delta V$ is supplied by an element 127 which receives as input the quantity Umax, Umin, and Uwt_ref. The adding element 125 outputs a new voltage reference value Uwt_ref_new 129 which is supplied to one or more wind turbines in order to cause a voltage perturbation needed for measuring a quantity which is indicative of a short-circuit ratio.

In particular, the voltage and current inputs 105 are also supplied to a measurement time coordination element 131 which derives therefrom the quantity $\Delta V$ and $\Delta Q$ corresponding to the deviation of a voltage and the deviation of a reactive power, respectively which is caused by supplying the new reference voltage values 129 to the wind turbine(s). After separation of the measurement signals illustrated as box 133, the quantities $\Delta V$ and $\Delta Q$ are supplied to the grid estimation element 135 which derives therefrom a signal 137 which is indicative of a short-circuit ratio of the utility grid to which the not illustrated wind turbines are connected.

Figure 2:
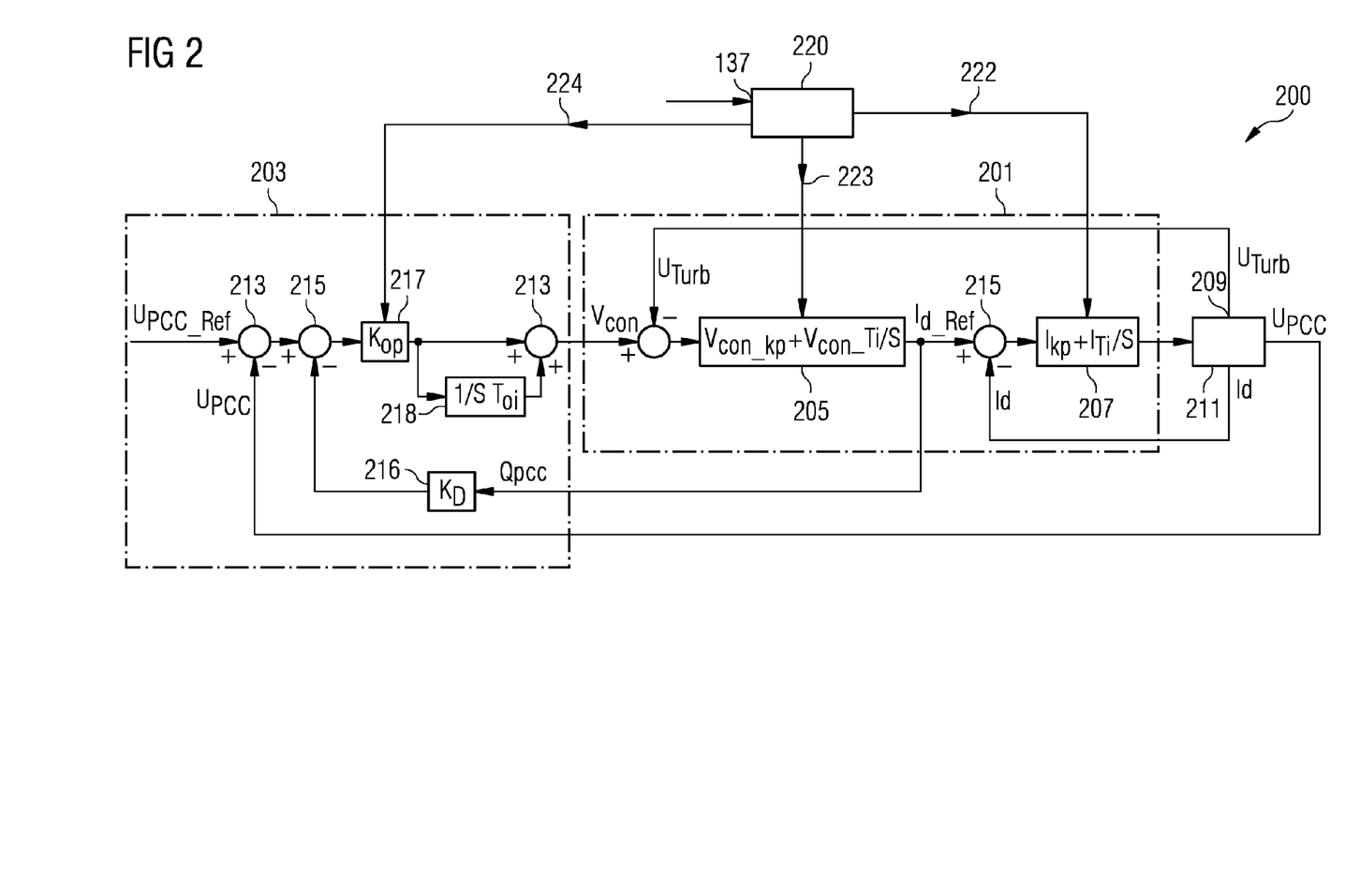
FIG. 2 schematically illustrates a control system whose control parameters are adjusted according to a method according to an embodiment of the present invention.

FIG. 2 schematically illustrates a simplified controller structure 200 in the network converter and park pilot. The control system 200 comprises a first controller 201 which is controlling a not illustrated wind turbine and a second controller 203 which is comprised in a park pilot. According to an embodiment of the present invention, at least one control parameter of the control system 200 is adjusted, when the short-circuit ratio which has been estimated by the signal 137 illustrated in FIG. 1, is smaller than a short-circuit ratio threshold. Therefore the arrangement 220 is provided that receive the estimated SCR 137 (output in FIG. 1) and sends control signals 222, 223, 224 (representing gain values e.g. according to FIG. 3) to controllers 207, 205, 217 described below.

The first controller 201 comprises a first voltage control portion 205 which is parameterized with a first voltage controlling proportional coefficient $V_{con-kp}$ and a first current control portion 207 which is parameterized with a first current controlling proportional coefficient $I_{kp}$. Thereby, the first voltage control portion 205 is provided with a difference signal derived from a quantity $V_{con}$ and a turbine voltage $U_{turb}$ which is measured at an output terminal 209 of the wind power plant model 211. The first voltage control portion 205 derives a quantity $I_{d-ref}$ representing a reference reactive current which is provided to an adding element 213 to which also the reactive current $I_d$ output at the wind power plant model 211 is supplied. The second current control portion 207 receives the difference output by the adding element 213 and supplies the result to the wind power plant model 211.

Further, the voltage at the point of common coupling $U_{PCC}$ is output by the wind power plant model 211 and is supplied to the second controller 203, in particular to an adding element 213 to which also a reference voltage at the point of common coupling ($U_{PCC-ref}$) is supplied. The result of the adding element 213 is supplied to a further adding element 215 which also receives a signal derived from a proportional gain element 216 which receives a reactive power output $Q_{PCC}$ at the point of common coupling, as derived from the reference of reactive current $I_{d-ref}$.

The result output from the adding element 215 is provided to a control element 217 which corresponds to a second voltage control portion comprised within the second controller 203. The second control portion 217 is parameterized with a second voltage controlling proportional coefficient $K_{0p}$.

According to an embodiment of the present invention, the first voltage controlling proportional coefficient $V_{con-kp}$, the first current controlling proportional coefficient $I_{kp}$ and the second voltage controlling proportional coefficient $K_{0p}$ are adjusted, if the short-circuit ratio is smaller than a short-circuit ratio threshold, as will be explained with reference to FIG. 3.

Figure 3:
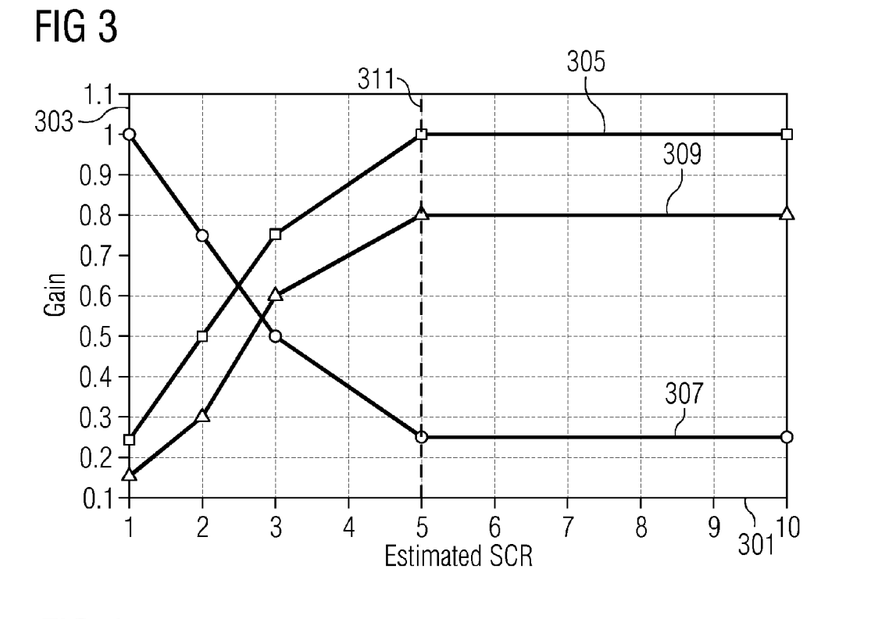
FIG. 3 illustrates a graph showing gain of several control elements in dependence of an estimated short-circuit ratio.

FIG. 3 illustrates the behavior of the coefficients of the first controller 201 and the second controller 203 illustrated in FIG. 2, depending on the estimated SCR (short-circuit ratio). The abscissa 301 in FIG. 3 denotes the estimated short-circuit ratio and the ordinate 303 of the graph illustrated in FIG. 3 denotes the respective gain of the respective coefficient of the first controller 201 and the second controller 203, respectively, illustrated in FIG. 2.

In particular, the curve 305 denotes the values of the first voltage controlling proportional coefficient $V_{con-kp}$ of the first voltage control portion 205 of the first controller 201. Further, the curve 307 indicates the values of the first current controlling proportional coefficient $I_{kp}$ of the first current control portion 207 of the first controller 201 illustrated in FIG. 2. Further, the curve 309 indicates the values of the second voltage controlling proportional coefficient $K_{0p}$ of the second controller 203 illustrated in FIG. 2.

As can be seen from FIG. 3, the value of the coefficient indicated by the curve 305 is constant above a short-circuit ratio threshold 311 which is in the illustrated example at a value of 5. Further, for decreasing short-circuit ratio below the short-circuit ratio threshold 311, the curve 305 decreases in particular approximately in a linear fashion from an exemplary value of around 1.0 to an exemplary value of around 0.25 at a short-circuit ratio of 1. Other values are possible.

Further, also the value of the coefficient indicated by the curve 309 stays constant above the short-circuit ratio 311 at a value of about 0.8 and decreases with decreasing short-circuit ratio approximately in a linear fashion to a value of approximately 0.15 at a short-circuit ratio of 1. Further, the gain coefficient indicated by the curve 307 is constant at a value of around 0.25 above the short-circuit ratio threshold 311 and increases with decreasing short-circuit ratio to reach a value of around 1.0 at a short-circuit ratio of 1. These numbers may be adapted according to the specific construction and application.

Thereby, a voltage stability may be improved and an active power output may be optimized or improved.

Figure 4:
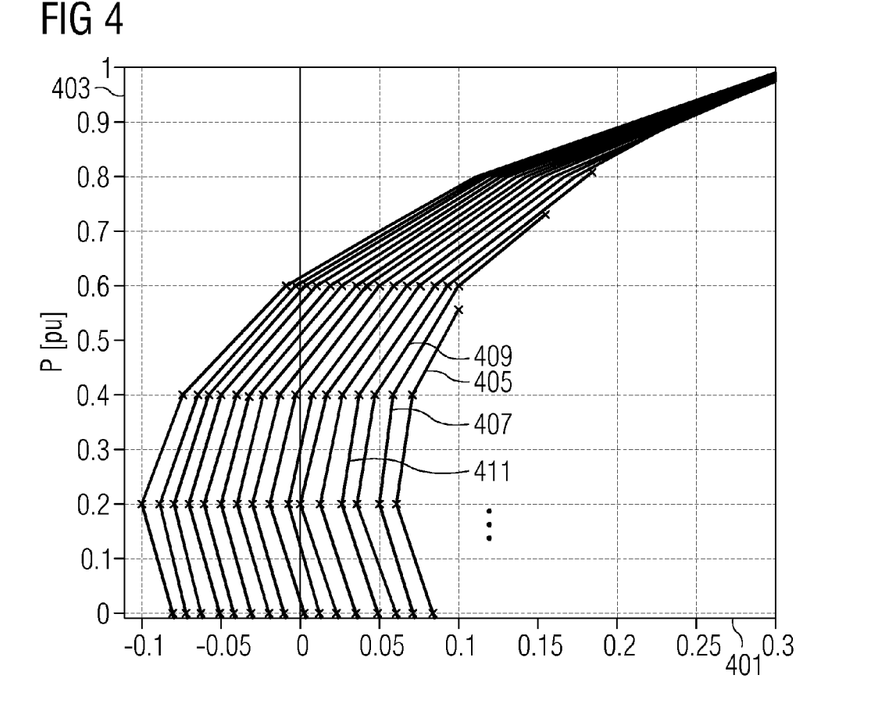
FIG. 4 schematically illustrates an operational area considered in a method according to an embodiment of the present invention.
Figure 5:
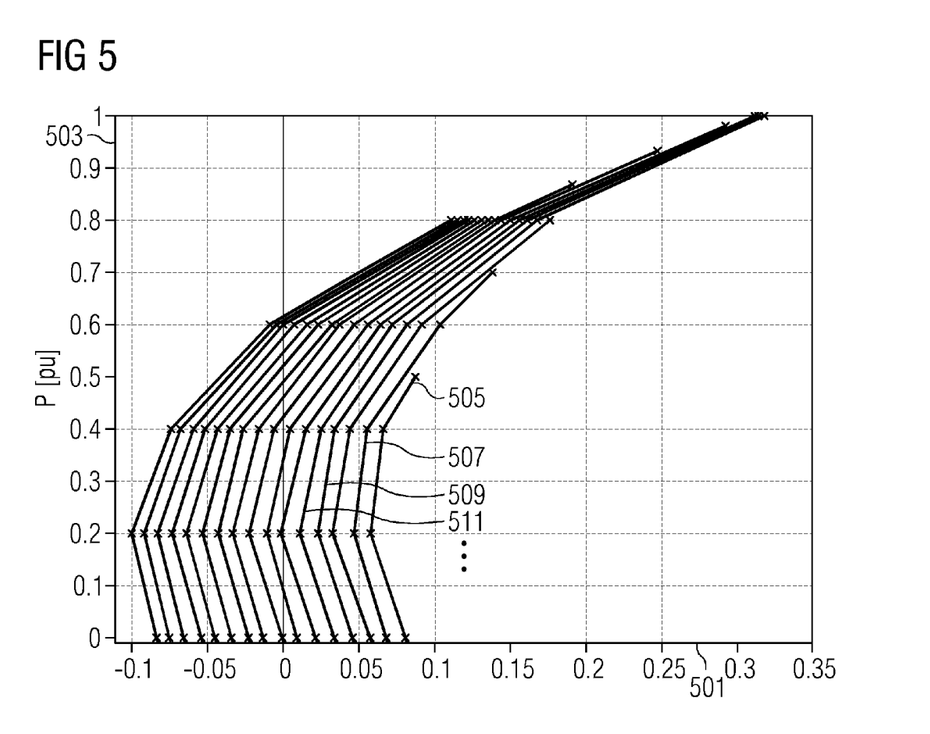
FIG. 5 schematically illustrates an operational area considered in a method according to an embodiment of the present invention.

FIGS. 4 and 5 illustrate graphs, wherein on abscissas 401, 501, respectively, the reactive power output Q of the wind turbine is illustrated and on the ordinates 403 and 503, respectively, the active power output P is indicated in a ratio of a nominal value, i.e. in per unit (pu).

The curves 405, 407, 409, 411 illustrate the behavior for different voltages ranging from 0.92-1.08 when measured as a ratio related to a nominal value.

Figure 6A:
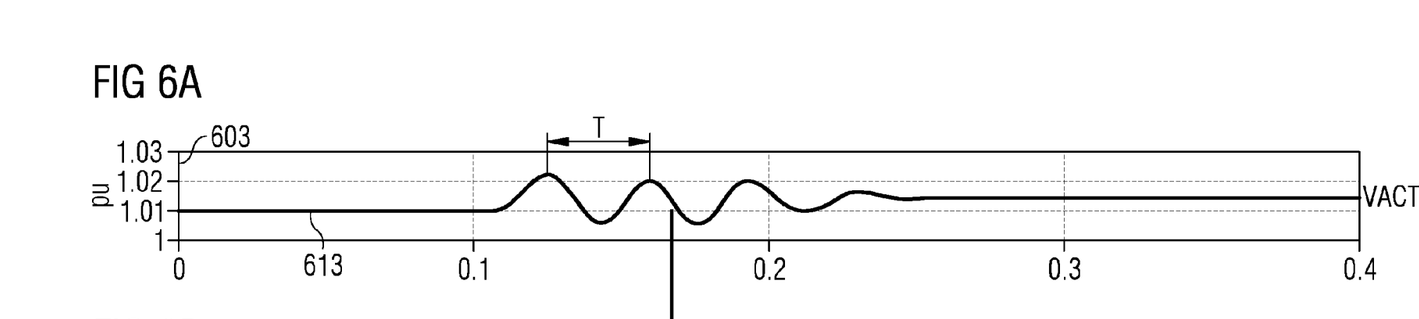
FIG. 6A schematically illustrates an actual voltage at time in second.
Figure 6B:
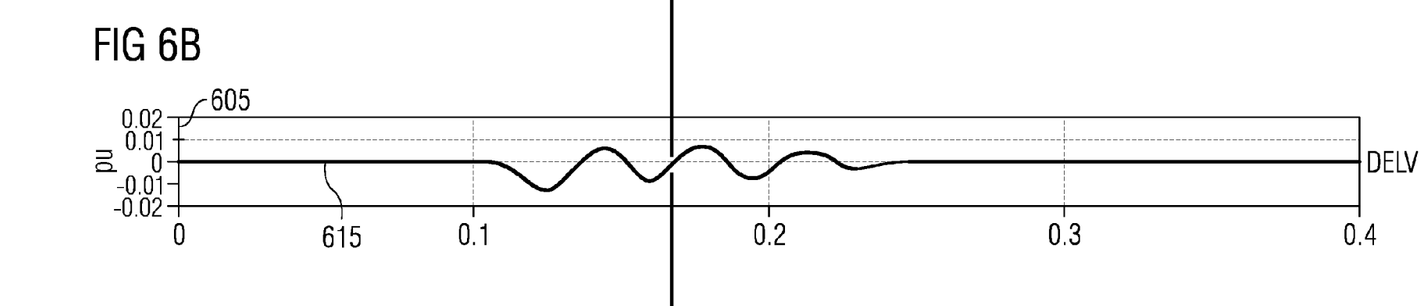
FIG. 6B schematically illustrates a voltage deviation at time in second.
Figure 6C:
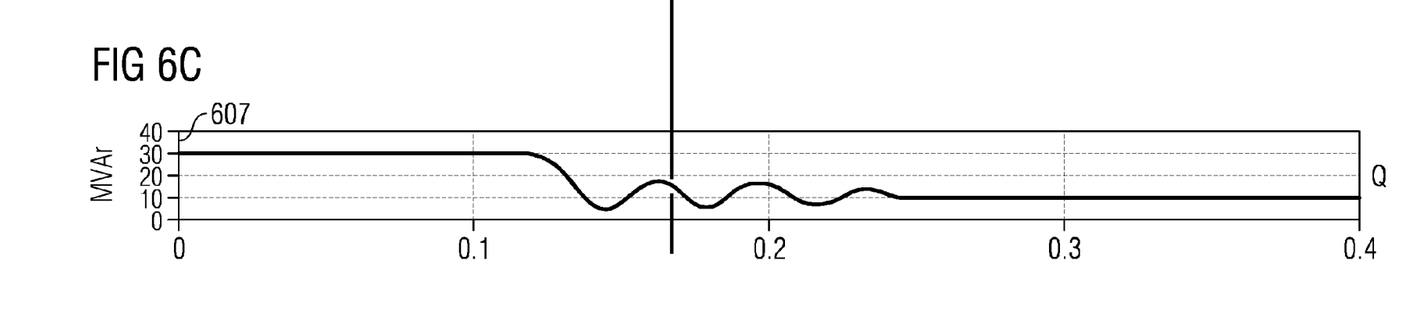
FIG. 6C schematically illustrates an actual reactive power at time in second.

FIGS. 6a)-6e) illustrate active power curtailment, when an oscillation of an amplitude of a voltage at the point of common coupling is detected according to an embodiment of the present invention.

In all graphs, the abscissa 601 denotes the time in seconds. The ordinate 603 of FIG. 6a) denotes an actual voltage, the ordinate 605 in FIG. 6b) denotes the voltage deviation, the ordinate 607 in FIG. 6c) denotes the actual reactive power Q, the ordinate 609 in FIG. 6d) denotes the controller output signal and the ordinate 611 of FIG. 6e) denotes the active power output P.

The curve 613 in FIG. 6a) denotes the actual voltage as monitored for example by the park pilot. As can be seen, the amplitude of the voltage 613 oscillates with a period T which is around 0.03 s. The oscillation is also observable in FIG. 6b) as a curve 615 illustrating the voltage deviation from the nominal voltage.

Figure 6D:
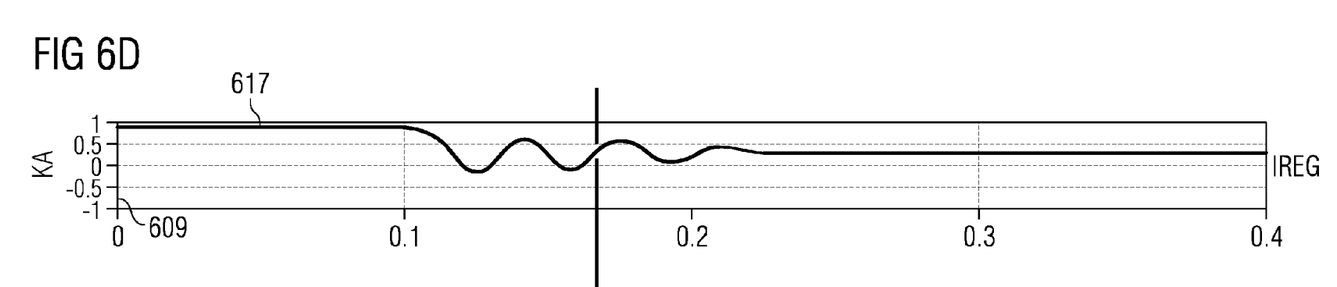
FIG. 6D schematically illustrates a controller output signal at time in second.
Figure 6E:
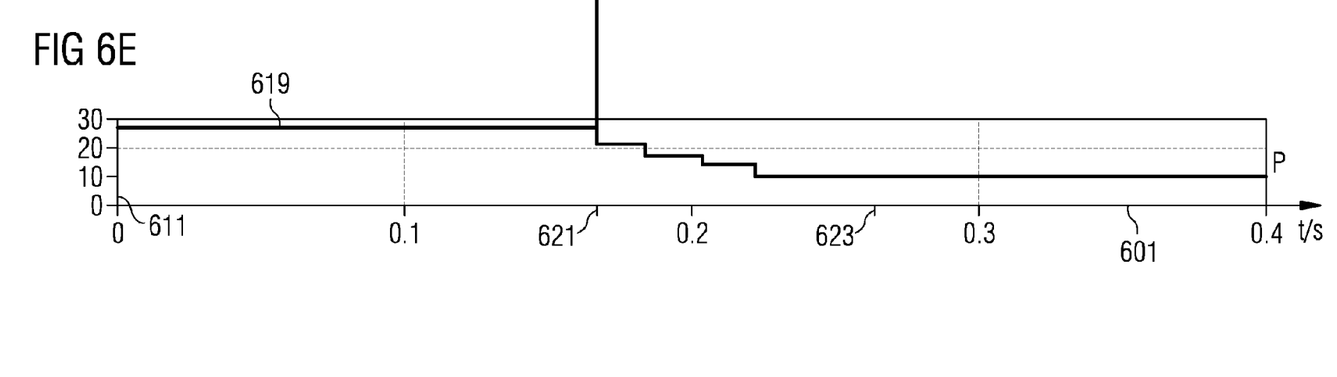
FIG. 6E schematically illustrates an active power output at time in second.

The controller output is illustrated in FIG. 6d) as a curve 617 which causes the wind turbine to output an active power according to a curve 619 illustrated in FIG. 6e). As can be seen at a time point 621, the active power output 619 is decreased in a stepwise manner, the FIG. 6e) in particular showing four steps of decreasing the active power output 619, in total for about 20% of a nominal active power output. As a result of the reduction of the active power output 619, the actual voltage illustrated in FIG. 6a) becomes, after having oscillated around constant at the slightly raised value at a time point 623 and stays then constant for later times.

Thereby, a stabilization of the voltage has been achieved by reducing the active power output from the wind turbine.

Before performing reducing the active power output, the oscillation of the actual voltage 613 has been monitored and detected.

Further, according to an embodiment of the present invention, after performing the active power curtailment according to FIG. 6 also the adjustment of the gain coefficients may be performed, as has been explained in the context of FIGS. 2 and 3.

According to an embodiment of the present invention it is proposed a weak grid stabilizer having four important aspects The first aspect is grid strength estimator. The second aspect is to adjust control gains of voltage controller in HPPP, voltage controller and current controller in turbine according to grid strength. The third aspect is to maintain turbine operating within available operational area with a predefined capacity reserve (predefined safety margin).

During steady state, grid estimation may be performed each 12 hours in park pilot voltage controller. Based on estimated SCR value, control gain factor may be adjusted and coordinated automatically if necessary.

When oscillation has been detected by hunting detector (see FIG. 6), active power curtailment will be performed until stable operation has been obtained. When stable operation has been established, grid estimation (see FIG. 1) will be performed and automatic gain adjustment and coordination will be carried out (see FIGS. 2, 3). Active power will recover to a value depending on SCR and predefined PQ capability reverse.

To minimize disturbance to grid, grid estimation may be run only when it is necessary. Grid estimation can be run cyclically every 12 hours (optional), e.g.

In general, the SCR estimated in FIG. 1 may be approximated to $$X \approx -j \frac{U_{pcc2} - U_{pcc1}}{\frac{Q_2}{3U_{pcc2}} - \frac{Q_1}{3U_{pcc1}}}$$

(– reciprocal of the short circuit current) or according to $$X = -\Delta U/\Delta Q$$

with assumption that active power is kept almost constant during estimation. In order to ensure accuracy of the estimation, active power production might be limited to certain value.

When starting to estimate strength of grid, the following steps may be applied.

Small amount of voltage deviation may be added to the actual voltage reference which will dispatch to each wind turbine within wind farm.

The actual voltage and the reactive power output at PCC may be measured before, during and after this modification. If the detected ΔQ is not enough to achieve accurate estimation, increase ΔV a bit until enough amount of ΔQ has been obtained.

Stop increasing ΔV immediately once enough amount of ΔQ has been obtained. In this way, the minimum amount of reactive power has been injected to the grid for grid estimation purpose.

During the measurement, the voltage controller and active power reference/active power controller are frozen for approximately 250 ms to guarantee an accuracy measurement and constant active power production. If a system disturbance is detected or the active power variation without the predefined range is detected, measurement is cancelled immediately.

Automatic gain adjustment and gain coordination in three controllers may be performed according to FIG. 3. As seen from FIG. 3, system gain changes dramatically with SCR and active power production especially in a low SCR grid. Therefore, it is very important to adjust control gain automatically to ensure stable operation over a wide range of power system short circuit levels. Depending on specific grid code requirement, it can also be tuned to achieve a constant response time over a wide range of power system short circuit levels.

The simplified controller structure illustrated in FIG. 2 applies to the network converter and park pilot. The overall controller has a three level cascaded structure with park pilot voltage controller 203 being outer loop, wind turbine voltage controller 205 being middle loop and wind turbine current controller 207 being the inner loop. In principle, voltage controller in park pilot should be much slower than voltage controller in the turbine controller and voltage controller in wind turbine should be much slower than current controller in the turbine controller. Therefore, it is very important to coordinate gain factors of the three control loops during automatic gain adjustment. FIG. 3 shows an example of gain factor coordination for three controllers. As an example, a standard value for the PI controller can be defined for all the three controllers. A lookup table could be created for the proportional gain as a function of the SCRs.

The gain adjustment and gain factor coordination can be carried out under e.g. the following conditions:

Cyclically every 12 hours depending on the change of the estimated impedance (optional)
After reduction of the active power by hunting suppression controller
After initialization of park pilot As seen from FIG. 4 that the width of the available operational area decreases significantly with increasing active power and decreasing SCR. In order to reserve predefined PQ capability to ensure stable operation especially during transience and under disturbance, active power curtailment is required when turbine operates approaching its limit. This can be implemented easily by setting reactive current and/or reactive power to have higher priority than active current and/or active power and limiting active current and/or active power with a predefined margin as follows (see also FIG. 6).

$$I_{q\_max} = \sqrt{I_{max}^2 - I_{d\_Ref}^2} - I_{Margin}$$

$$I_{q\_ref} < I_{q\_max}$$

$$I_{Margin} \propto 1/SCR$$

Here, $I_{d\_Ref}$ refers to reactive current reference, $I_{Margin}$ refers to pre-defined margin factor and it is inversely proportional to SCR (the lower SCR, the higher Imargin), $I_{max}$ refers to maximum current limited by converter capacity, $I_{q\_max}$ is the upper limit for active current reference and $I_{q\_ref}$ is active current reference.

In this way, enough reactive power capability of turbine has been ensured for voltage support and the left part of current will be used for active power production. Power curtailment may be done automatically and turbine will operate with predefined PQ capability reverse.

FIG. 4, 5 show available operational area for SCR=1.5 (on the bottom) at PCC with X2R=5 with Imargin=0.1 pu on FIG. 4 and Imargin=0.2 pu on FIG. 5). It can be seen that active power curtailment has been carried out automatically depending on operating points.

Enhancement of dynamic stability by hunting suppression is performed according to embodiments (see FIG. 6). Oscillation may occur on the event of small disturbance in a weak grid or on the change of operating point from a small system gain to a large one. Hunting suppression is important for dynamic stability improvement under very weak system conditions. When oscillatory behavior has been detected, the following actions may be taken:

Step 1: Prioritize reactive current than active current (Prioritize reactive power than active power)
Step 2: Curtail active power Z %, e.g., 20%.
Step 3: If stable operation can not obtained, curtail active power Z % again
Step 4: Repeat step 3 until stable operation has been obtained.
Step 5: after stable operation has been obtained, perform grid estimation and gain adjustment (see section 4.1 and 4.2)

Oscillation in the voltage/reactive power/current is monitored, once oscillation has been detected, the active power reference in the turbine controller may be reduced stepwise by, e.g., 20% at 4th change until stability is reached. Hunting suppression can be achieved by reducing control gain stepwise. However, active power curtailment is the most effective way.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method for controlling a wind turbine in a wind farm and connected to a point of common coupling being connected to a utility grid, comprising:
   measuring at least one quantity indicative of a short circuit ratio of the utility grid; and
   adjusting a control parameter of a control system controlling the wind turbine and the wind farm based on the measuring,
   wherein the adjusting comprises:
      adjusting at least one first gain of a first controller controlling the wind turbine; and
      simultaneously adjusting at least one second gain of a second controller controlling the entire wind farm,
   wherein the adjusting is performed such that the first controller is faster than the second controller, wherein the first controller and the second controller form a cascaded control system, and wherein active current output and/or active power output by the wind turbine is limited by a maximum active current and/or active power which is a difference between a first term and a second term which is inversely proportional to the short circuit ratio.

2. The method according to claim 1, further comprising operating the wind turbine with active power and/or reactive power capability reserve by giving reactive current and/or reactive power higher priority than active current and/or active power.

3. The method according to claim 1, wherein the first controller comprises:
   a first voltage control portion parametrized with a first voltage controlling proportional coefficient, and
   a first current control portion parametrized with a first current controlling proportional coefficient,
   wherein the adjusting comprises:
      increasing the first current controlling proportional coefficient with decreasing short circuit ratio;
      decreasing the first voltage controlling proportional coefficient with decreasing short circuit ratio,
      wherein the adjusting is performed such that the first current control portion is faster than the first voltage control portion.

4. The method according to claim 3, wherein the second controller comprises:
   a second voltage control portion parametrized with a second voltage controlling proportional coefficient,
   wherein the adjusting comprises:
      decreasing the second voltage controlling proportional coefficient with decreasing short circuit ratio,
      wherein the adjusting is performed such that the second controller is faster than the first controller.

5. The method according to claim 4, wherein the adjusting is performed only if the short circuit ratio is smaller than a short circuit ratio threshold.

6. The method according to claim 5, further comprising substantially keeping the first current controlling proportional coefficient, the first voltage controlling proportional coefficient, and the second voltage controlling proportional coefficient constant for a short circuit ratio above the short circuit ratio threshold.

7. The method according to claim 5, wherein the short circuit ratio threshold obtained for the point of common coupling is between 2 and 6, or between 3 and 5, or between 2.5 and 3.5.

8. The method according to claim 1, further comprising:
   monitoring an amplitude of an electrical quantity or controller output signal comprising voltage or RMS of voltage, output of controller at the point of common coupling; and
   curtailing active power output by the wind turbine in a stepwise manner by up to 20% of a nominal active power output if an oscillation of the monitored amplitude is detected,
   wherein the measuring and the adjusting is performed after curtailing the active power output.

9. The method according to claim 1, wherein the measuring is performed at the point of common coupling comprises:
   causing a voltage perturbation at the point of common coupling; and
   measuring a voltage and a reactive power before and after the voltage perturbation for obtaining a voltage deviation and a reactive power deviation.

10. The method according to claim 9, further comprising forming a ratio of the voltage deviation and the reactive power deviation.

11. The method according to claim 9, wherein the causing the voltage perturbation comprises increasing or decreasing a voltage reference supplied to the wind turbine in the wind farm.

12. The method according to claim 1, wherein voltage control and/or active power control of the wind turbine in the wind farm is disabled during the measuring for achieving a constant active power production.

13. The method according to claim 1, wherein the measuring is performed:
   cyclically after every time interval, wherein the time interval is between 10 minutes and 24 hours, or 12 hours, and/or
   when oscillation of an amplitude of a voltage at the point of common coupling is detected, and/or
   after initialization of a park pilot controlling the wind farm.

14. An arrangement for controlling a wind turbine in a wind farm and connected to a point of common coupling being connected to a utility grid, comprising:
   a measurement section adapted to measure at least one quantity indicative of a short circuit ratio of the utility grid; and
   an adjustment section adapted to adjust a control parameter of a control system controlling the wind turbine and the wind farm based on the measuring,
   wherein the adjusting comprises:
      adjusting at least one first gain of a first controller controlling the wind turbine; and
      simultaneously adjusting at least one second gain of a second controller controlling the entire wind farm,
   wherein the adjusting is performed such that the first controller is faster than the second controller,
   wherein the first controller and the second controller form a cascaded control system, and
   wherein active current output and/or active power output by the wind turbine is limited by a maximum active current and/or active power which is a difference between a first term and a second term which is inversely proportional to the short circuit ratio.

15. The arrangement according to claim 14, wherein the adjustment is performed if the short circuit ratio is smaller than a short circuit ratio threshold.

* * * * *